United States Patent [19]

Lin

[11] Patent Number: 5,854,674
[45] Date of Patent: Dec. 29, 1998

[54] METHOD OF HIGH SPEED, HIGH DETECTION SENSITIVITY INSPECTION OF REPETITIVE AND RANDOM SPECIMEN PATTERNS

[75] Inventor: Lawrence H. Lin, Alamo, Calif.

[73] Assignee: Optical Specialties, Inc., Fremont, Calif.

[21] Appl. No.: 865,380

[22] Filed: May 29, 1997

[51] Int. Cl.[6] .................................. G02B 27/42
[52] U.S. Cl. .......................................... 356/237
[58] Field of Search ................... 356/237, 239, 356/376, 338, 71, 344, 445, 446, 429–431, 336; 250/559.01, 559.04

[56] References Cited

U.S. PATENT DOCUMENTS

| Re. 33,956 | 6/1992 | Lin et al. | 250/550 |
|---|---|---|---|
| 3,614,232 | 10/1971 | Mathisen | 356/71 |
| 4,000,949 | 1/1977 | Watkins | 356/165 |
| 4,330,775 | 5/1982 | Iwamoto et al. | 340/146.3 P |
| 4,811,409 | 3/1989 | Cavan | 382/8 |
| 5,177,559 | 1/1993 | Batchelder et al. | 356/237 |
| 5,264,912 | 11/1993 | Vaught et al. | 356/237 |
| 5,410,400 | 4/1995 | Shishido et al. | 356/237 |
| 5,428,442 | 6/1995 | Lin et al. | 356/237 |
| 5,629,768 | 5/1997 | Hagiwara | 356/237 |

OTHER PUBLICATIONS

Dralla, John R. and Hoff, John C., "Minimization of false defect reporting in a patterned silicon wafer inspection system," *Proceedings of SPIE*, vol. 1661 (1992), pp. 312–322.

*Primary Examiner*—Frank G. Font
*Assistant Examiner*—Michael P. Stafira
*Attorney, Agent, or Firm*—Stoel Rives LLP

[57] ABSTRACT

A patterned specimen inspection system achieves the inherent advantages of the die to statistical image (DSI) inspection mode for repetitive and random patterns and simultaneously achieves the inspection speed of the optical pattern filtering (OPF) mode. A preferred embodiment entails producing a patterned specimen wafer image with coherent optical spatial frequency filtering, as in the OPF mode, and carrying out defect detection by pixel comparison, as in the DSI mode. For repetitive and random pattern areas, implementation of the invention increases the inspection speed of the DSI mode to approach that of the OPF mode because image spatial filtering enables the use of a large sized unit pixel. For the repetitive pattern, the ability to use a large unit pixel size results from the complete removal of light energy from the repetitive patterns in the image. For the random pattern, spatial filtering can remove a large portion of the light energy from pattern features, but light energy from some pattern features remains. The optical dynamic range (ODR) for defect detection sets the minimum required electrical dynamic range (EDR) of the electronic imaging system for converting the total optical energy present in a pixel into an electrical signal for defect data processing. With spatial filtering, the ODR for a unit pixel size matching that used in the OPF mode is reducible to a manageable level to enable increased inspection speed. Thus, the invention overcomes certain major limitations and retains unique advantages of the OPF and DSI inspection modes.

16 Claims, 8 Drawing Sheets

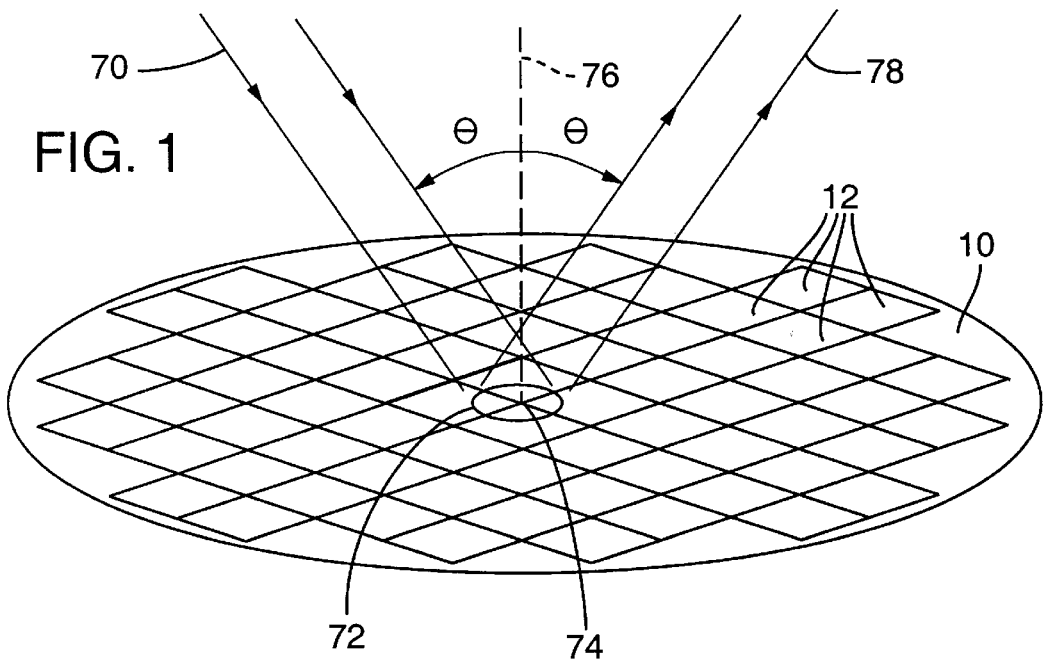
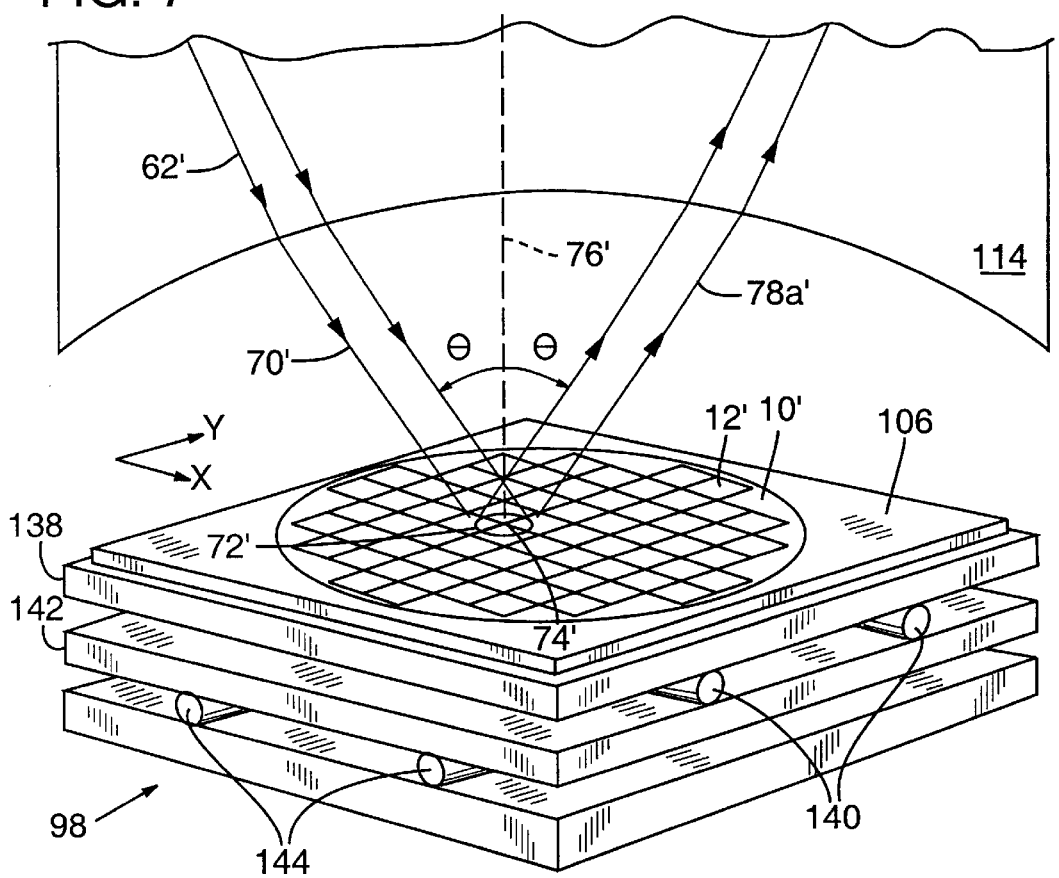

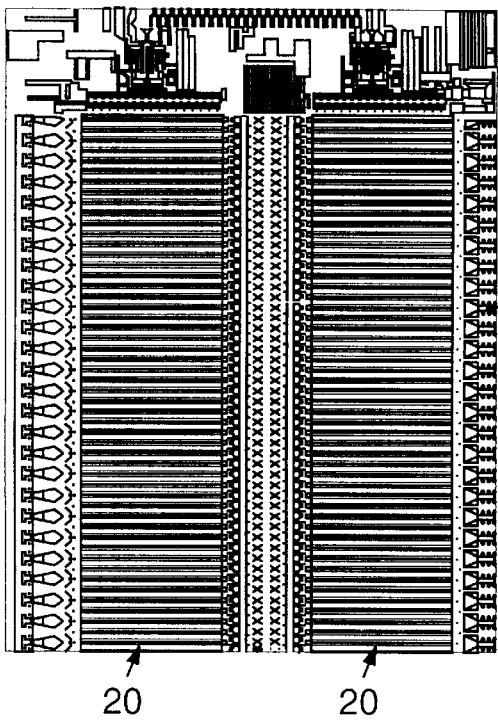
FIG. 2D
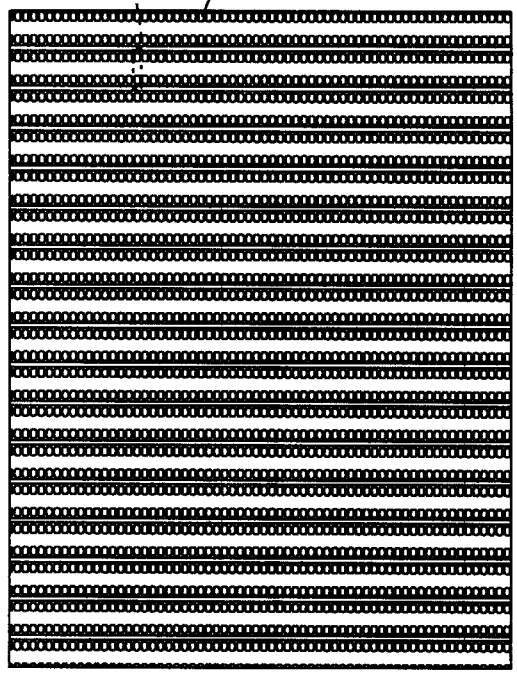
FIG. 2E
FIG. 2F
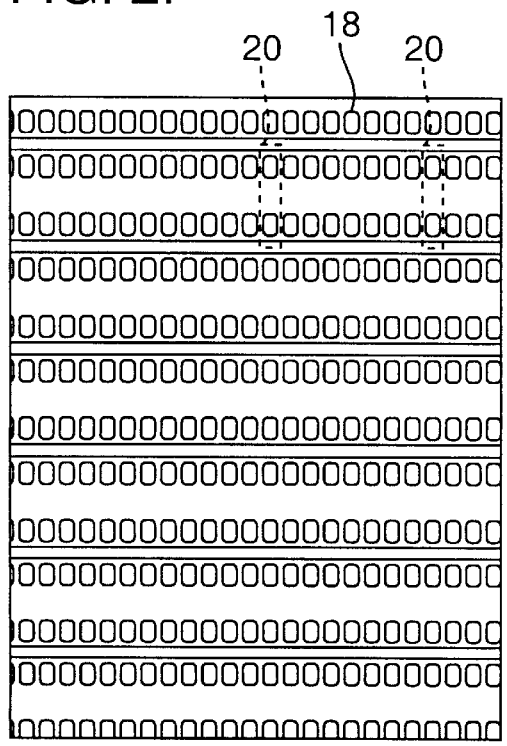

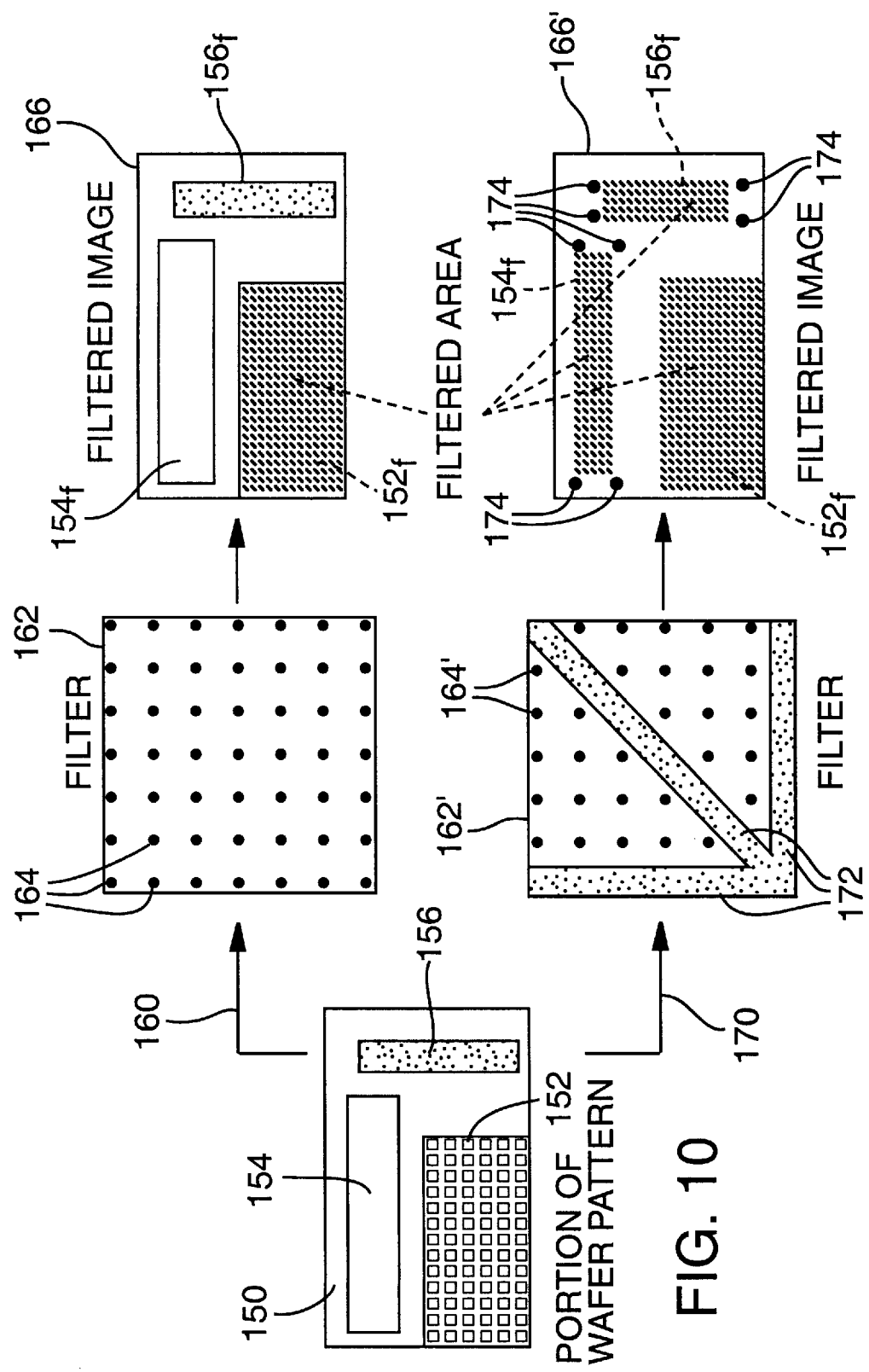

METHOD OF HIGH SPEED, HIGH DETECTION SENSITIVITY INSPECTION OF REPETITIVE AND RANDOM SPECIMEN PATTERNS

TECHNICAL FIELD

This invention relates to inspection systems for the use in the manufacture of patterned specimens such as flat panel displays and microcircuits and, in particular, to a high speed and high detection sensitivity real-time defect inspection system for use in the manufacture of patterned specimens that include many repetitive patterns and random patterns.

BACKGROUND OF THE INVENTION

U.S. Pat. Nos. 4,000,949 of Watkins and 3,614,232 of Mathisen describe similar inspection systems for pattern defects in photomasks employed in the large-scale manufacture of semiconductor devices and integrated circuits. The systems of Watkins and Mathisen contemplate the simultaneous inspection of all of the dies on a photomask that contains a regular array of normally identical dies to detect the presence of nonperiodic defects, i.e., defects in one die not identically repeated in the remaining dies of the array.

The inspection is accomplished by illuminating simultaneously all of the dies of a specimen photomask with collimated coherent light emanating from a laser and normally incident to the photomask surface to develop a composite diffraction pattern, the spatial distribution of which is the combination of inter-die interference pattern and intra-die interference pattern information. The light transmitted by the photomask strikes a double-convex lens that distributes the light onto a spatial filter positioned a distance equal to one focal length behind the lens. The spatial filter comprises a two-dimensional Fourier transform pattern of a known error-free reference photomask against which the specimen photomask is compared. The filter is opaque in the areas corresponding to spatial frequency components of the error-free Fourier transform pattern and is transparent in areas not included in the error-free Fourier transform pattern.

The spatial frequency components corresponding to the defects in the specimen photomask are largely transmitted through the spatial filter and can be processed in either one of two ways. In the Watkins system, the light transmitted through the spatial filter strikes another double-convex lens that is properly positioned to define an image of the specimen photomask, absent any information blocked by the spatial filter. The imaging light not blocked by the spatial filter appears in locations that represent the position in the specimen photomask where defects are present. In the Mathisen system, the light transmitted through the spatial filter is sensed by a photodetector that produces an output signal which activates a "no-go" alarm.

The Watkins and Mathisen patents describe systems in which it is exceedingly difficult to obtain from a lens system design the resolution required to acquire inter-die interference pattern information. The lens design problem renders such systems unreliable and impracticable for commercial use.

U.S. Pat. No. Re. 33,956, which is owned by the assignee of this patent application, describes an inspection system that uses intra-die interference pattern information to determine the presence of defects in a specimen having many redundant die circuit patterns. This system implements a technique referred to as "optical pattern filtering" (OPF).

The embodiments of the inspection system described employ a Fourier transform lens and an inverse Fourier transform lens positioned along an optic axis to produce from a laser beam-illuminated area of a patterned semiconductor wafer a spatial frequency spectrum whose frequency components can be selectively filtered to produce an image pattern of defects in the illuminated area of the wafer. The lenses collect light diffracted by a wafer die aligned with the optic axis and light diffracted by other wafer dies proximally located to such die, rather than light diffracted by the entire wafer. This restriction limits the applicability of the inspection system to dies having many redundant circuit patterns but permits the use of lenses that introduce off-axis aberrations that would otherwise alter the character of the Fourier transform pattern and the filtered defect image. The Fourier transform and imaging areas are of sufficient sizes to accommodate light from only the die circuit patterns aligned with the optic axis.

A spatial filter positioned in the plane of the Fourier transform pattern effectively stops the light transmission from the redundant circuit patterns of the illuminated die circuit patterns of the wafer but allows the passage of light originating from possible defects.

An inverse Fourier transform lens receives the light either transmitted through or reflected by the spatial filter (depending on the inspection system embodiment) and performs the inverse Fourier transform on the filtered light diffracted by the illuminated wafer area. The filtered image strikes the surface of a two-dimensional photodetector array that detects the presence of light corresponding to defects in only the illuminated on-axis circuit patterns. The photodetector array is centrally positioned about the optic axis and has a light-sensitive surface area of insufficient size to cover the image plane area in which the defect image corresponding to the on-axis die appears. The inspection of all possible defects in the portions of the wafer surface having many redundant circuit patterns is accomplished by mounting the wafer onto a two-dimensional translation stage and moving the stage so that the illumination area defined by the laser beam continuously scans across the wafer surface from die to die until the desired portions of the wafer surface have been illuminated. The use of a time delay integration mode of the photodetector array permits continuous stage movement and inspection of the portions of the wafer surface having many redundant circuit patterns in a stripe-to-stripe raster scan fashion.

U.S. Pat. No. 5,428,442, which is assigned to the assignee of this patent application, describes a system similar to the system described in U.S. Pat. No. Re. 33,956 except that a nearly collimated beam of light emitted by a laser strikes a patterned specimen wafer at an angle with respect to the normal of the wafer, the angle measuring between zero degrees and a predetermined maximum angle. The Fourier transform lens captures light diffracted from the inspection area at such angles within the range of zero degrees and the predetermined maximum and generates Fourier transformed light from the captured light. The predetermined maximum angle is generally limited by the numerical aperture of the Fourier transform lens. The use of an in-lens, off-axis illuminator provides an inspection system that does not suffer from appreciable residual specular reflection from the lens elements and the patterned surface of the specimen wafer.

The system collects and processes a broad range of spatial frequency components from the low, the mid-level, and the relatively high spatial frequencies in the Fourier transform plane. All of the broad range of spatial frequency components reside substantially in only one of the four quadrants in the Fourier transform plane.

Model Series Nos. IQ-1850 and IQ-1860 inspection systems manufactured by Optical Specialties, Inc., Fremont, Calif., the assignee of this patent application, perform defect inspection of a patterned wafer having repetitive and random pattern areas. Inspection of the repetitive pattern areas of the wafer is generally accomplished with the system operating in the above-mentioned optical pattern filtering (OPF) mode at a high inspection speed and of the random pattern areas in a die to statistical image (DSI) mode at a relatively much slower inspection speed.

The OPF mode uses coherent optical spatial frequency filtering, which enables complete removal of repetitive patterns in the filtered wafer image while leaving defects essentially unaltered. The resulting filtered image can, therefore, be divided into unit pixels, the size of each is much larger than the minimum pattern feature, and the use of large size unit pixels allows rapid scanning of the filtered image to locate defects. (A pixel is typically of square shape, the size of which is represented by the length of its sides.) Thus, high inspection speed and detection sensitivity are simultaneously achieved in the OPF mode, but only for the repetitive patterns.

The DSI mode uses a wafer image obtained by means of bright-field, white light conventional microscopy. This unfiltered, noncoherent-light wafer image is divided into many small unit pixels, the unit pixel size being about the same as the minimum pattern feature. To detect defects, the statistical image characteristics of the light energy in the neighborhood of (e.g., about 20 pixels around) each unit pixel are calculated and compared with the characteristics of the corresponding unit pixel of a previously obtained and stored statistical image. The optical energy level distribution of neighborhood pixels determines the statistical image characteristics and hence the effectiveness of the comparison algorithm. A difference between the computed and previously stored statistical images of corresponding pixels indicates the presence of a defect at that pixel location.

The DSI mode can be applied to both repetitive and random patterns, while the OPF mode is applied only to repetitive patterns. As a consequence of the small pixel size used, the DSI mode is inherently much slower than the OPF mode for the same detection sensitivity. The DSI mode is used only where necessary to not unduly compromise the overall inspection speed of the IQ-1850 and IQ-1860 systems.

SUMMARY OF THE INVENTION

The present invention achieves the inherent advantages of the die to statistical image (DSI) inspection mode for repetitive and random patterns and simultaneously achieves the inspection speed of the optical pattern filtering (OPF) mode. Although it is equally applicable to defect inspection of other patterned specimens, such as flat panel display devices, charge-coupled device (CCD) panels, shadow masks for color cathode-ray tubes, and semiconductor wafers and photolithographic masks, the invention is described by way of example only for patterned semiconductor wafer inspection.

The invention entails producing a patterned wafer image with coherent optical spatial frequency filtering, as in the OPF mode, and carrying out defect detection by pixel comparison, as in the DSI mode. For repetitive and random pattern areas, implementation of the invention increases the inspection speed of the DSI mode to approach that of the OPF mode. This is so because image spatial filtering enables the use of a large sized unit pixel. For the repetitive pattern, the ability to use a large unit pixel size results from the complete removal of light energy from the repetitive patterns in the image. For the random pattern, spatial filtering can remove a large portion of the light energy from pattern features, but light energy from some pattern features remains.

The ratio of the optical energies of the remaining features in a unit pixel to the optical energy of the smallest defect of interest in the same unit pixel is a pertinent parameter for defect detection sensitivity. This ratio, which is called the optical dynamic range (ODR) for defect detection, sets the minimum required electrical dynamic range (EDR) of the electronic imaging system for converting the total optical energy present in a pixel into an electrical signal for defect data processing. The ODR, and hence the required EDR, increases with increasing unit pixel size but decreases with the amount of pattern spatial filtering. With spatial filtering, the ODR for a unit pixel size matching that used in the OPF mode is reducible to a manageable level to enable increased inspection speed.

Currently available electronic imaging systems are implemented with 8-bit gray-level resolution to provide an EDR of 256:1. The use of an 8-bit EDR electronic imaging system results in achieving a desirable inspection speed for all pattern areas but a somewhat reduced detection sensitivity for random pattern areas only. The present invention is, therefore, a method of defect inspection of patterned specimens that is based on the current independent OPF and DSI inspection modes and overcomes certain major limitations and retains unique advantages of the OPF and DSI inspection modes.

Additional objects and advantages of this invention will be apparent from the following detailed description of preferred embodiments thereof which proceeds with reference to the accompanying drawings.

BRIEF DESCRIPTION OF THE DRAWINGS

FIG. 1 is a simplified diagram showing an isometric view of a semiconductor wafer and the angular relationship of its patterned surface and propagation paths of light rays used by a wafer inspection system implemented with the present invention.

FIGS. 2D–2F are photographs of a portion of a different die showing for consecutive increasing magnifications die circuit patterns of a highly redundant circuit pattern.

FIG. 7 is an isometric view of a semiconductor wafer mounted on a two-dimensional translation stage for movement relative to the propagation paths of light rays used by the wafer inspection system of FIG. 6.

FIG. 10 is a process flow diagram showing the result of spatial filtering of repetitive and random circuit pattern features of a portion of a semiconductor wafer die pattern.

DETAILED DESCRIPTION OF PREFERRED EMBODIMENTS

Figure 2A:
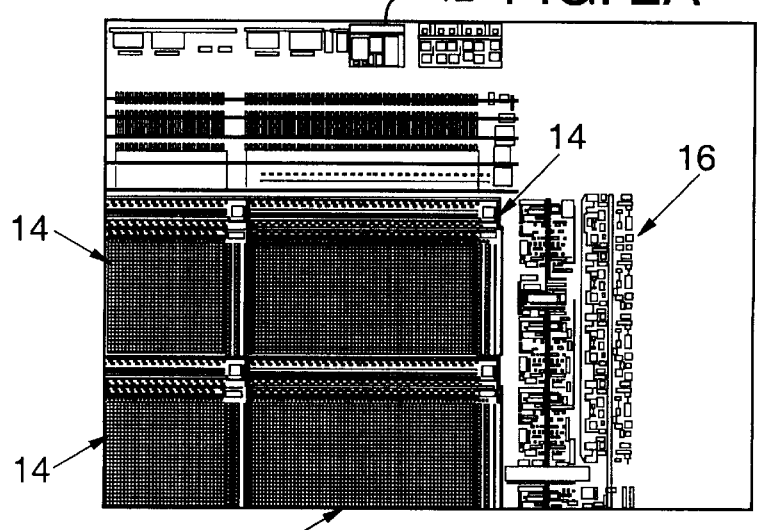
FIGS. 2A–2C are photographs of a portion of an exemplary die of the semiconductor wafer of FIG. 1 showing a random circuit pattern and highly redundant circuit patterns for consecutively increasing magnifications.
Figure 2B:
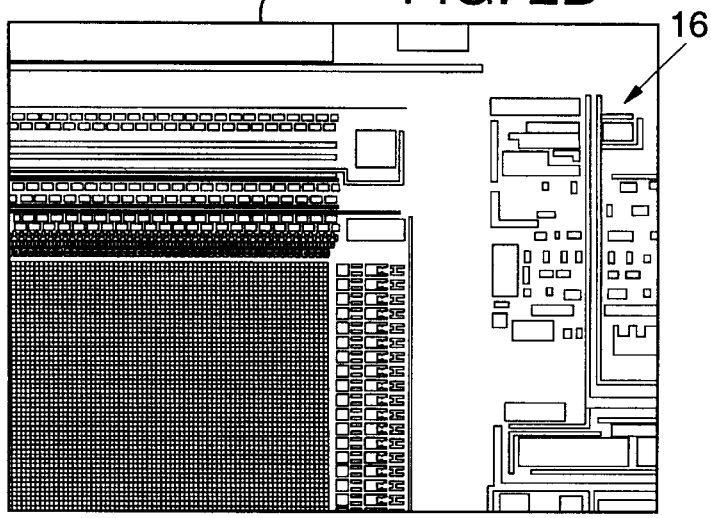
Figure 2C:
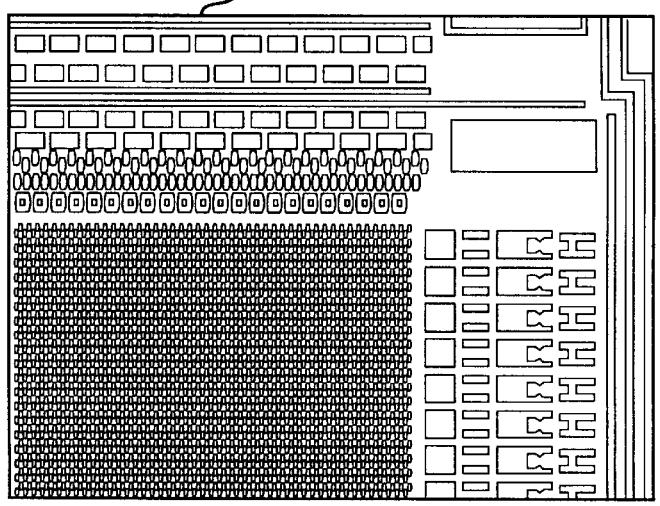

FIG. 1 is a diagram, and FIGS. 2A–2C are photographs of a portion of a die 12, of a patterned semiconductor wafer specimen 10 of the type an inspection system implementing the present invention is designed to inspect. Semiconductor wafer 10 includes a regular array of normally identical dies 12 of which each has multiple repetitive circuit pattern areas 14 and a random circuit pattern 16. Each die 12 is typically of square shape with about a 1 centimeter side. FIGS. 2D–2F are photographs of a different die 18 showing highly repetitive die circuit patterns 20 for three different magnifications. Although they are of rectangular shape as shown in FIGS. 2E and 2F, die circuit patterns 20 are assumed for purposes of simplicity to be of square shape with between about 5 and 50 micron sides.

Figure 3:
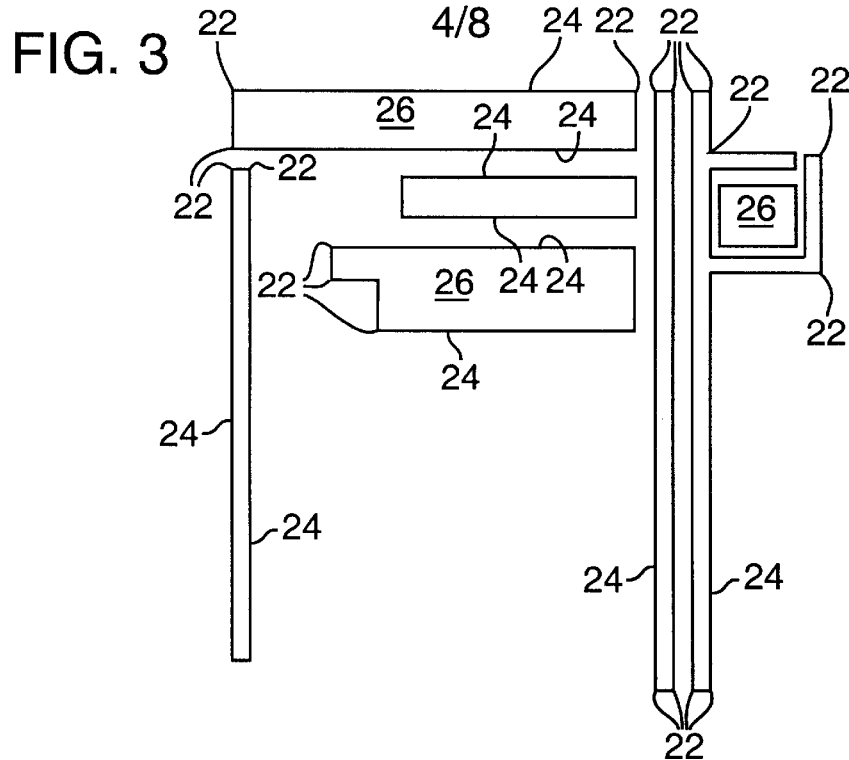
FIG. 3 is an enlarged view of the random circuit pattern features shown in FIGS. 2A and 2B.

The present invention is premised on the use of an optical spatial filter to isolate and remove image components representing certain characteristic features in a random pattern to increase the unit pixel size and thereby increase inspection speed without unduly sacrificing defect detection sensitivity. The optical energy in each unit pixel contains several possible components that represent certain pattern features. These components include (apart from any optical noise): a) light diffracted from corners and curved edges of circuit features, b) light diffracted from the central segments (i.e., excluding the two ends) of straight edges, c) light reflected from unpatterned areas and interior areas (bounded by either straight or curved edges) of circuit features, and d) light diffracted from a small (sub-unit pixel size) defect. FIG. 3 identifies in random circuit pattern 16 features including corners 22, straight edge sections 24 of different lengths, and reflective (i.e., either partly or totally reflective) areas 26 of different sizes that correspond to components a, b, and c, respectively.

A defect can be successfully detected if the light energy ratio R=(a+b+c)/d is within the electrical dynamic range (EDR) of the image signal processing electronics used for pixel comparison. Components a, b, and c generally increase with unit pixel size, while component d remains unchanged for small (sub-unit pixel size) defects of interest. For a given EDR (typically 256:1 or 8 bits), the maximum allowable unit pixel size in the prior art DSI mode is limited typically to a value equal to about twice the smallest detectable defect size. With certain implementations of the invention, this unit pixel size limitation can be made much less stringent in many practical cases.

In the present invention, the wafer image is produced with coherent optical spatial frequency filtering as in the OPF mode, but defect detection is carried out by pixel comparison as in the DSI mode. In the repetitive pattern areas of the image, a discrete frequency spatial filter effectively reduces components a, b, and c to insignificant values. The existing, or available, electrical dynamic range is, therefore, sufficient to allow a much larger unit pixel size (e.g., 2.6 $\mu$m for prior art OPF mode) for detecting defects much smaller (e.g., 0.2 $\mu$m) than the unit pixel size. For these areas, the defect inspection speed and detection sensitivity closely match those achievable with the prior art OPF mode.

Figure 4:
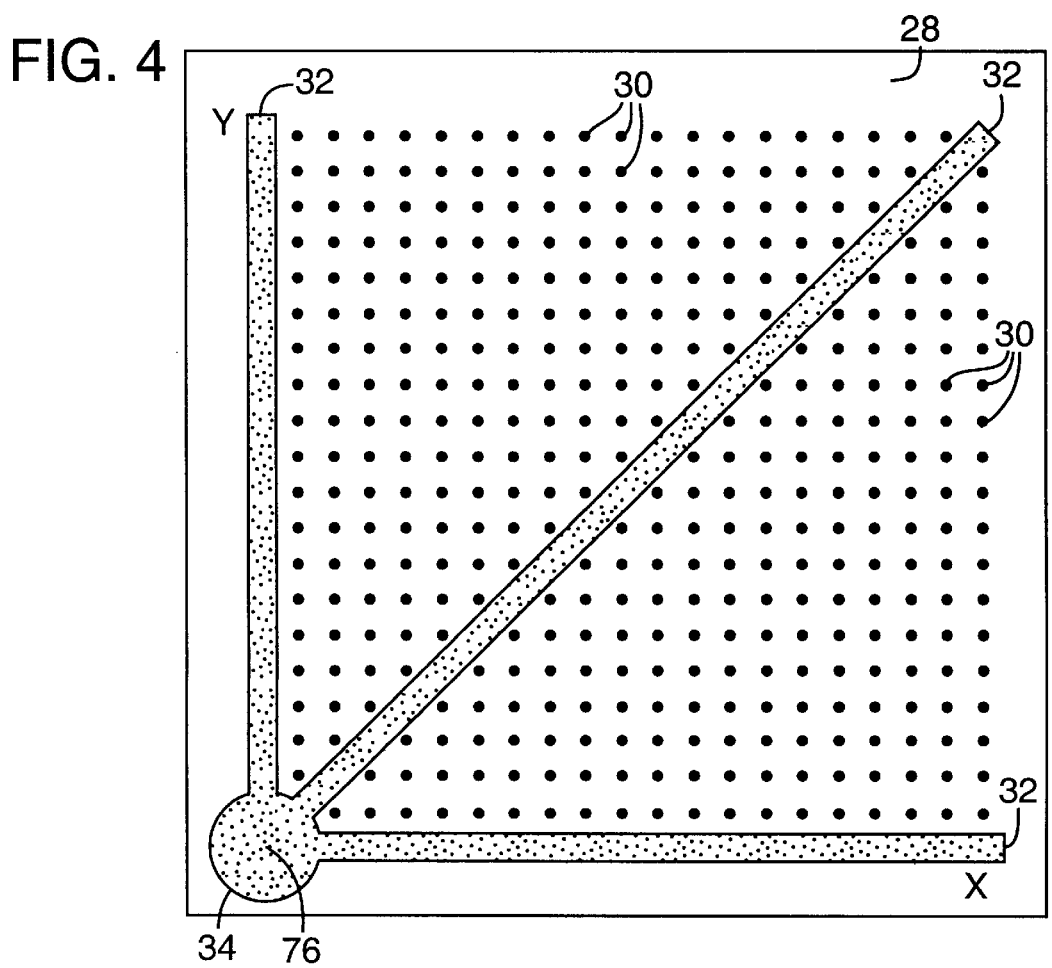
FIG. 4 shows an arrangement of discrete frequency and zero diffraction order nontransparent regions of a typical spatial filter used in connection with the present invention.

In the random pattern areas of the image, discrete spatial frequency filtering is infeasible; therefore, only low (near zero-order of each orthogonal axis) spatial frequencies are removed from the image with a universal filter 28 of a type having the first quadrant of a "Union Jack" pattern, as shown in FIG. 4. Spatial filter 28 includes nontransparent discrete frequency dots 30, nontransparent zero order diffracted light bars 32, and a nontransparent circular region 34 located at the intersection of bars 32. The three bars 32 block light representing straight edge features oriented relative to each other at 45° and 90°. Spatial filter 28 effectively reduces components b and c to insignificant values, leaving only components a and d, if they exist. Component b is eliminated because it corresponds to a straight edge section 24, which is equivalent to an infinite number of repetitive dots connected together and thus effectively a localized repetitive pattern that can be filtered. Component c, which can be totally or partly reflective, produces in the Fourier transform plane zero order reflected light that circular region 34 blocks.

The above-defined light energy ratio R is, therefore, reduced for all pixels in these areas. This reduced R allows in the majority of cases a significant unit pixel size increase over the prior art bright-field microscopy-based DSI mode. If the unit pixel size is chosen to be as large as 2.6 $\mu$m as in the typical OPF mode, in the portion of the area covered by pixels containing no component a (i.e., no feature corners), the defect inspection speed and detection sensitivity (e.g., 0.2 $\mu$m) closely match those achievable with the OPF mode. In the portion of the area covered by pixels containing significant a values, the detection sensitivity will, however, be worse than 0.2 $\mu$m, resulting from limitation by the existing dynamic range of the signal processing electronics (EDR) described above. This limitation can be overcome with the use of higher level resolution, e.g., 10 bits, which enables achievement of equally high detection sensitivities for random pattern areas and repetitive pattern areas.

This deficiency of lower detection sensitivity exists, however, only in some limited cases and in small areas of the die. There are two techniques for overcoming this deficiency. One is reducing the pixel size, and suffering the consequent throughput reduction penalty; and the other is, as indicated above, increasing the electrical dynamic range, primarily with the use of a charge-coupled device (CCD) camera with 10-bit gray level resolution. OPF mode detection sensitivity for random pattern areas can be achieved with 10-bit gray level resolution.

The relative intrinsic inspection speed improvement achievable with implementation of the present invention can be expressed as follows:

$$\left(\frac{P_O}{P_D}\right)^2,$$

in which $P_O$ and $P_D$ represent the minimum unit pixel size for detecting a defect of a particular size for the OPF and DSI modes, respectively. For $P_O$=2.6 $\mu$m and $P_D$=0.4 $\mu$m, there is a 42.25 times increase in inspection speed achievable by the present invention over that achievable by the DSI mode.

The processing of spatial frequency components to determine the presence of a possible defect or possible defects entails defining an array of pixels for the light pattern resulting from light unblocked by and passing through the spatial filter. Statistical characteristic computation is carried out by using a mathematical construct to subdivide the filtered light pattern into a grid of many pixels, each of unit pixel size as described above. A statistical characteristic for each pixel is derived from the light energy present in the pixel and neighboring pixels (e.g., 20 pixels composed of the five pixels nearest each side of the pixel for which a statistical characteristic is derived). To ensure each pixel has a complete set of neighbors from which to derive a statistical characteristic, the grid is selected to be larger than the inspection area covered by the filtered light pattern. An exemplary statistical characteristic for a pixel is an average of the light intensities present in the pixel and its neighboring pixels. Another statistical characteristic suitable for use with the present invention is implemented in the software provided with the Model Series Nos. IQ-1850 and IQ-1860 described above in the background of the invention.

The statistical characteristic computed for each of the pixels is compared with a reference statistical characteristic previously computed and stored for a corresponding pixel defined for a filtered light pattern of a reference specimen. A difference between the computed and previously stored statistical characteristics of corresponding pixels indicates the presence of a defect at that pixel location.

The reference statistical characteristics can be determined from selected "teaching" dies of the specimen before actual inspection is undertaken or can be taken from a set of previously calculated and stored reference statistical image for a standard reference specimen of the type undergoing inspection. The statistical image technique is described by Dralla, John R. and Hoff, John C. in "Minimization of false defect reporting in a patterned silicon wafer inspection system," *Proceedings of SPIE*, Vol. 1661 (1992), pp. 312–22.

Figure 5:
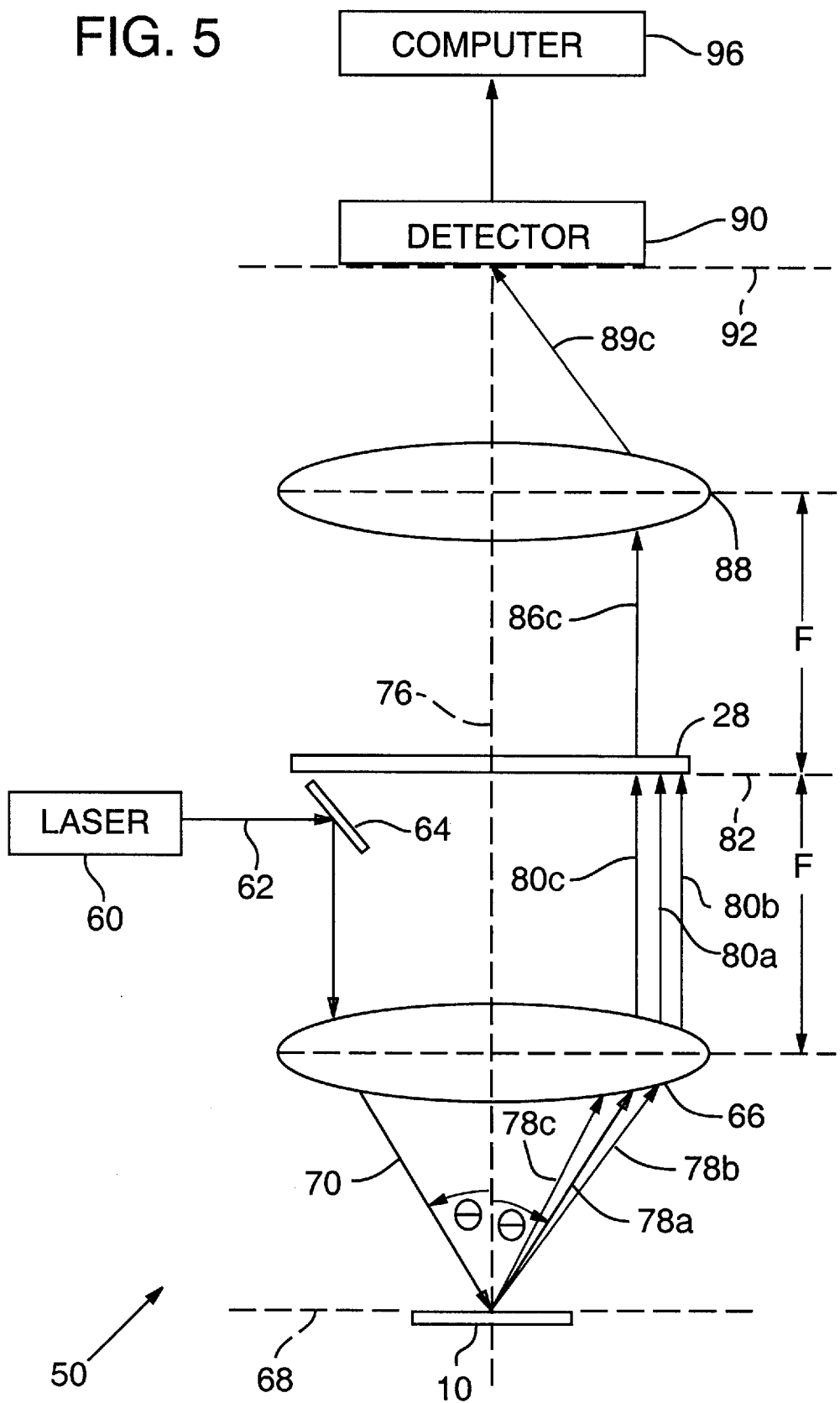
FIG. 5 is a simplified block diagram of a semiconductor wafer inspection system in which the present invention is implemented.
Figure 6:
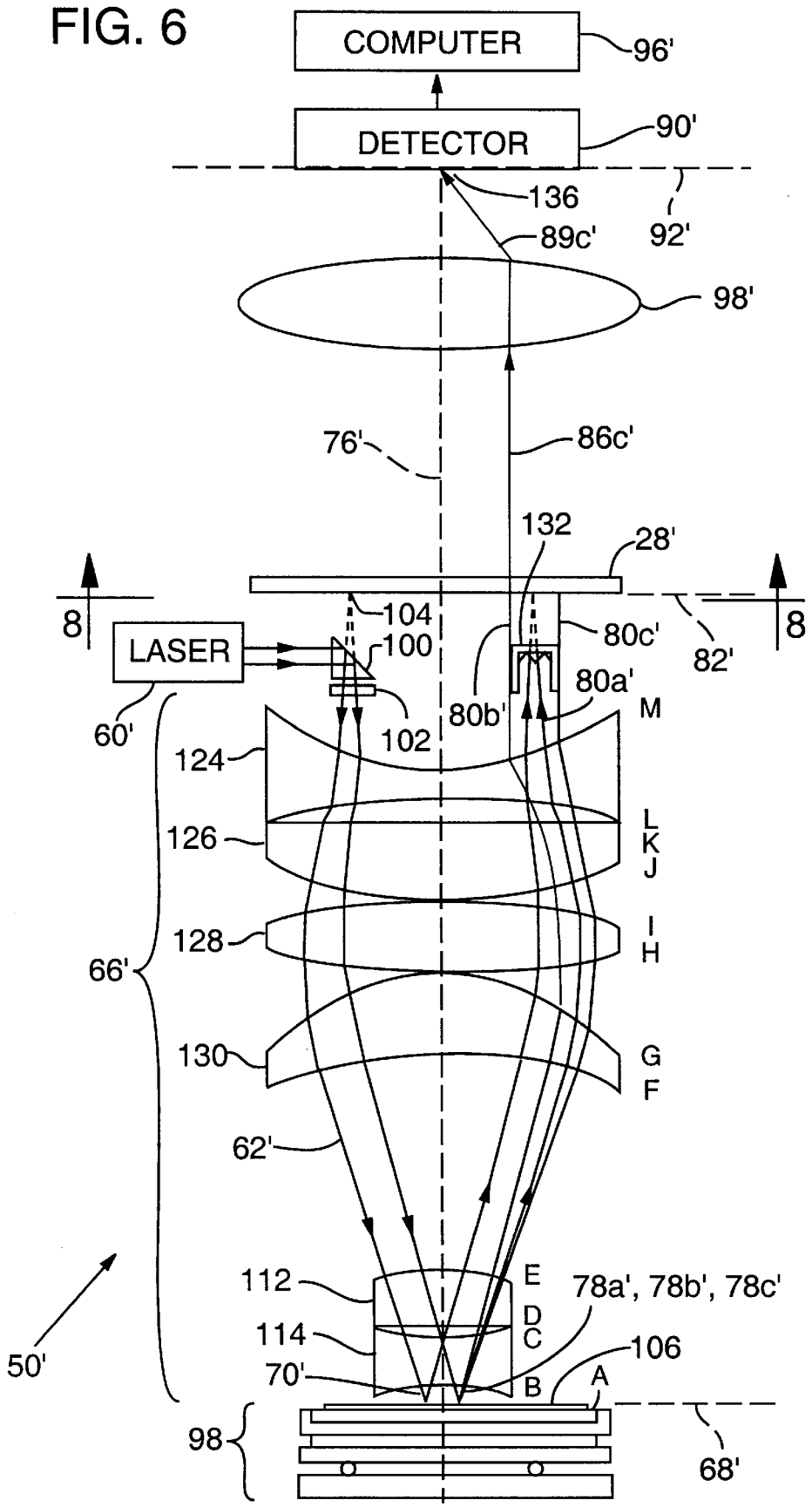
FIG. 6 is a block diagram showing in greater detail certain of the components of the wafer inspection system of FIG. 5.

An inspection system implementing the present invention employs a combination of dark field imaging, Fourier spatial filtering, and an in-lens, off-axis illuminator to detect a broad range of different sized pattern defects in patterned specimens. FIGS. 5 and 6 are block diagrams of wafer inspection systems in which the present invention can be implemented. These systems are adaptations of those described in U.S. Pat. No. 5,428,442. In FIGS. 5 and 6, the propagation paths of incident light and diffracted light are illustrated by ray tracing, the traced rays being shown in solid lines. These lines represent the propagation paths of incident or diffracted light but do not represent points on the object being imaged.

FIG. 5 is a simplified schematic diagram of an embodiment of an inspection system 50 of the present invention that is designed to detect semiconductor wafer defects having a diameter of about 0.1 micron or larger in the presence of a periodic structure comprising many redundant circuit patterns.

With reference to FIG. 5, inspection system 50 includes a laser source 60 that provides a beam 62 of monochromatic light that strikes a mirror 64, which deflects beam 62 to a Fourier transform lens 66. Fourier transform lens 66 is located approximately one focal length away from the surface of semiconductor wafer 10. In FIG. 5, Fourier transform lens 66 is shown as one lens, but, as will be shown and discussed in conjunction with FIG. 6, lens 66 is composed of multiple elements. Fourier transform lens 66 collimates beam 62 of monochromatic light as it propagates therethrough to form a nearly collimated beam 70. Semiconductor wafer 10 is positioned on an object or front focal plane 68 of Fourier transform lens 66, and nearly collimated beam 70 of monochromatic light illuminates the patterned surface of semiconductor wafer 10. Specifically, with reference to FIG. 1, nearly collimated beam 70 of monochromatic light illuminates an elliptical inspection area 72 on the patterned surface of semiconductor wafer 10. A line normal to and intersecting semiconductor wafer 10 at the center 74 of elliptical inspection area 72 defines an optic axis 76, which is collinear with the optic axis of Fourier transform lens 66.

With reference to FIGS. 1 and 5, nearly collimated beam 70 of monochromatic light strikes semiconductor wafer 10 at an angle ($\theta$) with respect to optic axis 76. The angle ($\theta$) is selected to illuminate semiconductor wafer 10 sufficiently so the die circuit patterns of repetitive circuit pattern areas 14 and random circuit pattern 16 (FIGS. 2A–2C) can be inspected and so that a broad, non-repetitive spatial frequency spectrum can enter into inspection system 50. For inspection system 50, these criteria set the angle ($\theta$) to be as large as possible.

Light ray 78a is reflected and light ray 78b and 78c are diffracted from inspection area 72 of semiconductor wafer 10 at angles of between zero degrees and a predetermined maximum angle with respect to optic axis 76. (Light rays 78a, 78b, and 78c are depicted collectively as light ray 78 in FIG. 1.) Reflected light ray 78a and diffracted light rays 78b and 78c propagate through Fourier transform lens 66. Light ray 78a represents light produced by zero order diffraction, i.e., reflection; and light rays 78b and 78c represent light diffracted by the die circuit patterns and a defect, respectively. The diffracted light that passes through Fourier transform lens 66 forms a Fourier transform pattern 80 (FIG. 8) of the illuminated semiconductor wafer surface. Pattern 80 appears in a Fourier transform plane 82 located one focal length away from Fourier transform lens 66. Light rays 80a, 80b, and 80c form Fourier transform pattern 80, which comprises an array of bright spots of light that are distributed in Fourier transform plane 82 in a predictable manner as will be described below in conjunction with FIG. 8.

Previously fabricated spatial filter 28 is positioned in Fourier transform plane 82 so that the intersection of bars 30 of the first quadrant "Union Jack" pattern is coincident with optic axis 76. Bars 32 of spatial filter 28 block the spatial frequencies of light ray 80a representing the zero order diffracted light. Discrete frequency dots 30 of spatial filter 28 block the spatial frequencies of light ray 80b representing the Fourier transform of the illuminated repetitive die circuit patterns and the central segments of straight edge features of the illuminated random die circuit patterns in inspection area 72. Spatial filter 28 allows the passage of light rays 86c originating from possible defects and the end portions of the straight edge features in the die circuit patterns. Light ray 86c not blocked by spatial filter 28 strikes an inverse Fourier transform lens 88 that is shown schematically as a single lens but which is in fact composed of several lens elements (not shown). Inverse Fourier transform lens 88 performs the inverse Fourier transform on the filtered light pattern of the illuminated die circuit patterns in inspection area 72. Inverse Fourier transform lens 88 is positioned symmetrically about optic axis 76 and one focal length behind Fourier transform plane 82.

A photodetector array 90 is centrally positioned about optic axis 76 in an image plane 92 and receives light ray 89c carrying the image of the straight edge segment end portions and any defects present in the die circuit patterns. Image plane 92 is located near the back focal plane of inverse Fourier transform lens 88. Photodetector array 90 receives the image of the straight edge segment end portions and of any defects present in wafer dies 12 within inspection area 72, converts them into digital data, and provides the digital data to a computer 96. Computer 96 accesses a previously stored reference statistical image of the pixels included within inspection area 72 and analyzes the acquired data to discriminate and localize any irregularities in inspection area 72 on the surface of semiconductor wafer 10.

FIG. 6 is a block diagram of a practical implementation of inspection system 50 of FIG. 5, and like reference numerals followed by primes designate elements in FIG. 6 previously described in FIG. 5. With reference to FIG. 6, the individual lens elements that compose Fourier transform lens 66' together with the relevant technical data about each lens element are described in conjunction with a two-dimensional translation stage 98 that moves semiconductor wafer 10' relative to collimated beam 70' of monochromatic light. Inspection system 50' includes a laser 60' that provides a 488 nanometer beam 62' of monochromatic light that is approximately 3 millimeters in diameter. Beam 62' of monochromatic light deflects off a prism 100, through a lens 102, and towards Fourier transform lens 66'. The purpose of prism 100 and lens 102 is to make beam 62' of monochromatic light appear, relative to front focal plane 68', as a point source 104 that is located on Fourier transform plane 82'. The focal plane of Fourier transform lens 66' is positioned a distance of one focal length away from lens 102 to provide a nearly collimated beam 70' of monochromatic light that strikes the patterned surface of wafer 10' (FIG. 7). Semiconductor wafer 10' is mounted on a vacuum chuck 106 that constitutes part of translation stage 98. Wafer 10' is positioned in object or front focal plane 68' of Fourier transform lens 66', and nearly collimated beam 70' of monochromatic light illuminates the patterned surface of wafer 10'. Nearly collimated beam 70' of monochromatic light illuminates an inspection area 72' of approximately 3 millimeters in diameter of the surface of wafer 10'. (Skilled persons will appreciate that inspection area 72' is slightly elliptical because of the angle ($\theta$) at which collimated beam 70' strikes wafer 10'.)

With reference to FIG. 7, nearly collimated beam 70' of monochromatic light strikes semiconductor wafer 10' at an angle ($\theta$) with respect to optic axis 76'. In the embodiment shown in FIG. 7, this angle ($\theta$) can be as small as zero degrees and as large as the predetermined maximum angle. The maximum predetermined maximum angle is the angle formed when beam 70' of monochromatic light is as far away as possible from optic axis 76' yet still within the numerical aperture of Fourier transform lens 66'. Typically, for the embodiment shown in FIG. 7, an angle ($\theta$) of about 22.5 degrees for a 3 millimeter diameter beam allows the system to collect a broad spatial frequency spectrum.

More specifically, with reference again to FIG. 6, Fourier transform lens 66' is designed to meet the following three design requirements. First, Fourier transform lens 66' together with inverse Fourier transform lens 88' forms an image of sufficient resolution in image plane 92' so that straight edge segment end portions and defects accentuated by the Fourier filtering process are focused small enough for adequate signal-to-noise ratio detection. Second, the spot sizes in Fourier transform plane 82' of Fourier transform lens 66' are sufficiently small, relative to their separation, so that spatial filter 28' transmits diffracted light having an adequate signal-to-noise ratio so that detector 90' can detect defects. Third, the focal length of Fourier transform lens 66' produces a Fourier transform of sufficient scale so that registration of spatial filter 28' with Fourier transform plane 82' is practicable.

In particular, the lens design of Fourier transform lens 66' is composed of two groupings, each of which is positioned along and centered about optic axis 76'. A first group of lenses composed of a plano convex lens 112 and a double concave lens 114 corrects for excessive coma but introduces only minor power into lens 66'. A second group of lenses composed of a double concave lens 124, a plano convex lens 126, a double convex lens 128, and a negative meniscus lens 130 focuses the reflected light ray 80a' and diffracted light rays 80b' and 80c' on Fourier transform plane 82'. The second group of lenses also collimates diffracted light ray 86c' for collection by inverse Fourier transform lens 88' and corrects for aberrations so as to ensure an adequate signal-to-noise ratio for the spots on Fourier transform plane 82'.

Tables I and II summarize the design specifications for and the spacing between adjacent elements of Fourier transform lens 66'. The surfaces A–M correspond in general to the lettered surfaces in FIG. 6, in which surface "A" corresponds to the object focal plane 68' and surface "M" corresponds to double concave lens 114. In each instance, the radius and the aperture diameter of the surface are given and the shape of each surface is spherical, except for surfaces "D" and "K", which are flat. A positive radius for a surface indicates the center of curvature is to the top in the drawing, and a negative radius indicates the center of curvature is to the bottom in the drawing. Dimensions are given in millimeters, and the axial distance to the next surface is measured from bottom to top in FIG. 6.

TABLE 1

| Surface | Radius of Curvature | Axial Distance to Next Surface | Aperture Diameter |
|---|---|---|---|
| A | Infinity | 5.670311 | 10 |
| B | −59.36 | 12.95353 | 47.6 |
| C | 78.257 | 2 | 47.6 |
| D | Infinity | 15.18587 | 47.6 |
| E | −45.72 | 52.7006 | 47.6 |
| F | −123.19 | 19.91053 | 101.6 |
| G | −62.027 | 0.3307335 | 101.6 |
| H | 192.913 | 16.64789 | 101.6 |
| I | −192.913 | 1.163321 | 101.6 |
| J | 125.095 | 17.79352 | 101.6 |
| K | Infinity | 5.988601 | 101.6 |
| L | −183.794 | 7.277428 | 101.6 |
| M | 76.251 | 8.66013 | 101.6 |

TABLE 2

| Surface D | |
|---|---|
| Index of Refraction | 1.80533 |
| Abbe Number | 25.39 |
| Surface F | |
| Index of Refraction | 1.63603 |
| Abbe Number | 35.34 |
| Surface H | |
| Index of Refraction | 1.69944 |
| Abbe Number | 30.07 |
| Surface J | |
| Index of Refraction | 1.69944 |
| Abbe Number | 30.07 |
| Surface L | |
| Index of Refraction | 1.62512 |
| Abbe Number | 35.7 |

Figure 8:
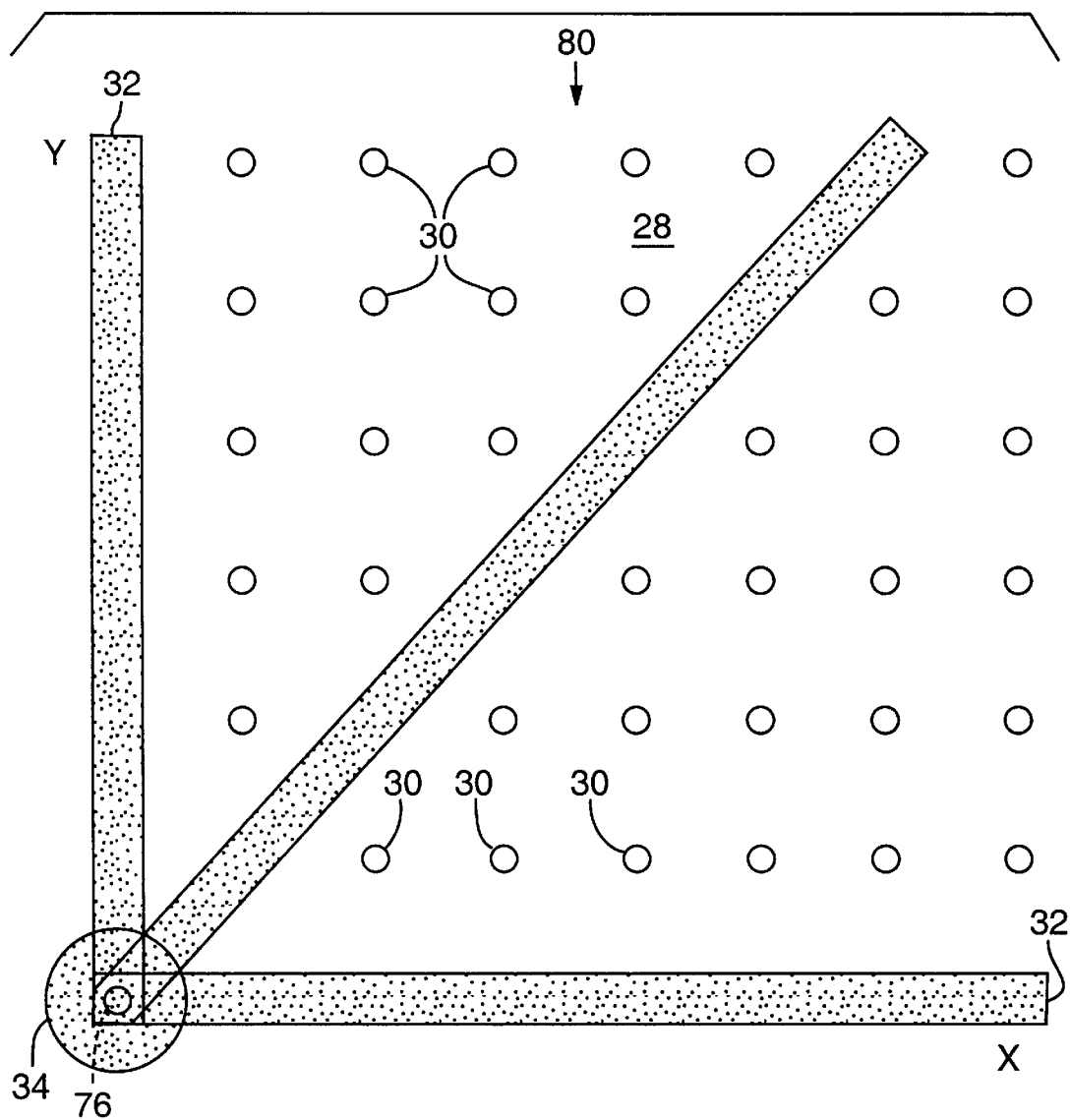
FIG. 8 shows an enlarged portion of a sectional view taken along lines 8—8 of FIG. 6 to show the superposition of the Fourier transform light pattern of the semiconductor wafer onto the discrete frequency dots of the spatial filter.

Light rays 78b' and 78c' diffracted from inspection area 72' pass through Fourier transform lens 66', which transforms the angular differences in diffracted light rays 78b' and 78c' at object plane 68' into spatial location differences in Fourier transform plane 82'. FIG. 8 shows superimposed on a portion of the dot pattern of spatial filter 28' at Fourier transform plane 82' various light spots developed from certain light rays diffracted by wafer 10'. With reference to FIGS. 6 and 8, the zero order diffracted light 80a' representing reflected light enters and does not propagate past a light trap 132. First, second, and third order diffracted light 80b' representing redundant die circuit patterns and straight edge central segments create light spots that are coincident with and blocked by discrete frequency dots 30 of spatial filter 28'. Light 80c' diffracted by straight edge segment end portions or a defect strikes spatial filter 28' at a location 134 not coincident with any of spots 30 in the array or bars 32. The processing of light ray 80c' propagating through spatial filter 28' and inverse Fourier transform lens 88' to photodetector array 90' as light ray 89c' is the same as that described for the corresponding light rays in FIG. 5.

The magnification of inverse Fourier transform lens 88' is of an amount that approximately matches the resolution limit of the image to the pixel size of photodetector array 90'. In particular, photodetector array 90' has a light sensitive surface 136 whose dimensions are about 13 millimeters× 3.25 millimeters and an approximately 13 micrometer pixel size. A 10-fold magnification is, therefore, a proper amount to match object plane 68' resolution of 1.0 micron from the Fourier transform lens 66' to the 13 micrometer pixel size of the photodetector array 90'.

To inspect the entire patterned surface of wafer 10', translation stage 98 sequentially moves each portion of wafer 10' under inspection area 72' for illumination by laser 60'. The area of a light sensitive surface 136 of the stationary photodetector array 90' limits the amount of light detected to that of a portion of the image corresponding to only wafer 10' centered about inspection area 72'. The movement of translation stage 98 is continuous in a stripe-to-stripe serpentine fashion to implement a time delay integration technique for collecting the defect information for each die on the patterned surface of wafer 10'. The determination of the presence of defects in wafer 10' is accomplished by partitioning it into striped regions (not shown) of 1.3 millimeters in width and moving translation stage 98 in a serpentine scan fashion so that the 3 millimeter diameter spot emanating from laser 60' illuminates stripe-by-stripe the entire surface of wafer 10'. The 3 millimeter spot diameter magnifies to 6 millimeters by the time the light emanating from laser 60' reaches wafer 10'.

Translation stage 98 comprises an X-Y positioning table that is capable of positioning wafer 10' under inspection area 72' for illumination by the 6 millimeter diameter beam 70' of collimated monochromatic light. A top or Y-stage 138 of translation stage supports chuck 106 and moves wafer 10' along the Y direction on rollers 140. A bottom or X-stage 142 moves wafer 10' along the X direction on rollers 144. One suitable type of X-Y positioning table is a Model MICROGLIDE 300 manufactured by Anorad Corporation of Hauppauge, N.Y.

A control circuit (not shown) for translation stage 98 keeps wafer 10' moving at a constant speed as it positions each stripe region (not shown) for illumination by the laser 60'. Translation stage 98 provides position coordinate information indicating the position of translation stage 98 and the position of defects in the corresponding filtered image relative to a known location on wafer 10'. The accumulation of light energy to facilitate detection of image defects is performed in accordance with a time delay integration (TDI) technique, which is described fully in U.S. Pat. No. Re. 33,956. Skilled persons will appreciate that an air table (not shown) could replace translation stage 98 and sequentially move each portion of wafer 10' under the inspection area 72'. The result of the TDI process is a map of light energy not blocked by spatial filter 28', which map is stored in computer 96' and processed in comparison with a reference statistical image as described above.

Figure 9:
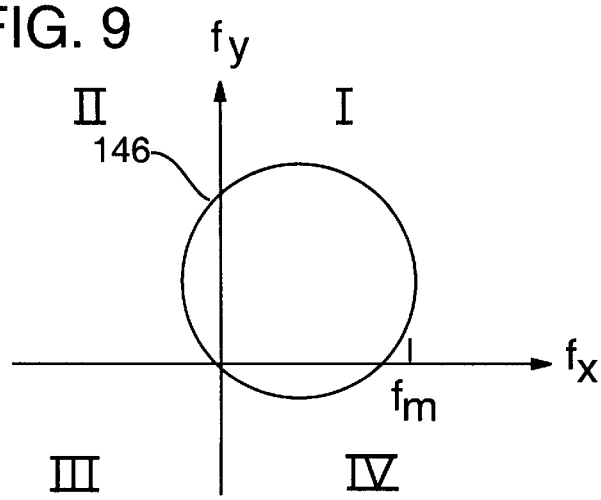
FIG. 9 shows that the spatial frequency information the wafer inspection systems of FIGS. 5 and 6 acquire from the semiconductor wafer resides primarily in the first quadrant of the Fourier transform plane.

The inspection systems shown in FIGS. 5 and 6 each collect a broad spatial frequency spectrum that allows the system to detect a broad range of different sized defects. FIG. 9 shows the collected spatial frequency spectrum in Fourier transform plane 82. (For clarity, only system 50 will be referred to hereafter.) Because the defects on wafer 10 can be considered planar, the defect spatial frequency spectrum is considered symmetrical along both the $f_x$ and $f_y$ axis in FIG. 9 so that the spatial frequency spectra in the four quadrants I, II, III, and IV in FIG. 9 are identical. The angle (θ) facilitates collecting low, mid-level, and relatively high spatial frequencies within a circle 146. The maximum spatial frequency is identified as $f_m$ in FIG. 9. Accordingly, system 50 can detect a broad range of defect sizes from very small size defects that have relatively high spatial frequencies associated with them to large size defects that have relatively low spatial frequencies associated with them.

Moreover, system 50 can be optimized for detecting a specific range of defect sizes. By moving the angle (θ) with respect to optic axis 76 at which collimated beam 70 of monochromatic light strikes wafer 10, system 50 will collect a different spatial frequency spectrum for each angle. Specifically, the larger the angle (θ), the more spatial frequency components in the higher frequency range will be collected at the expense of collecting fewer spatial frequency components in the lower frequency range. Thus, if a specific range of defect sizes is anticipated for a group of wafers 10 to be inspected, then system 50 can be optimized by setting the angle (θ) at which collimated beam 70 of monochromatic light strikes wafer 10 to the angle (θ) that allows system 50 to collect those spatial frequencies that are best representative of the anticipated range of defect sizes.

FIG. 10 illustrates the spatial filtering process of repetitive and random circuit pattern features. With reference to FIG. 10, a defect-free portion of a wafer pattern 150 including repetitive die circuit patterns 152, an open interior bar 154, and a solid bar 156. Process path 160 shows a spatial filter 162 having an array of discrete frequency dots 164 that remove only information representing repetitive die circuit patterns 152. A resulting filtered image 166 shows the presence of open interior bar $154_f$ and solid bar $156_f$ and the absence of repetitive die circuit patterns $152_f$ (represented by slanted lines) after inverse Fourier transformation.

Process path 170 shows a spatial filter 162' having an array of discrete frequency dots 164' and zero order diffracted light bars 172 coincident with the respective X and Y axes that removes information representing repetitive die circuit patterns $152_f$ and all but the corner features of open interior bar $154_f$ and of solid bar $156_f$. A resulting filter image 166' shows the presence of light spots 174 that after inverse Fourier transformation represent the corner features the statistical imaging process implemented by a system with the appropriate EDR discriminates from defect information in accordance with the present invention.

It will be obvious to those having skill in the art that many changes may be made to the details of the above-described embodiments of this invention without departing from the underlying principles thereof. The scope of the present invention should, therefore, be determined only by the following claims.

I claim:

1. A method of detecting defects in a patterned specimen having repetitive die circuit patterns and random die circuit patterns, comprising:

illuminating plural die circuit patterns;

generating a light pattern representing substantially the Fourier transform pattern of the illuminated die circuit patterns;

positioning an optical filter to receive the light pattern and to block spatial frequency components thereof, the optical filter having relatively transparent and relatively nontransparent portions, the relatively nontransparent portion conforming to the Fourier transform pattern of an error-free reference pattern corresponding to substantially all features of the repetitive die circuit patterns and selected features of the random die circuit patterns;

collecting spatial frequency components not blocked by the optical filter to form a filtered light pattern that includes image defect information; and processing unblocked spatial frequency components to determine the presence of a possible defect in the patterned specimen, the processing including defining an array of pixels for the filtered light pattern and determining for each of multiple pixels in the array a statistical characteristic derived from an amount of light energy present in the pixel, each of the multiple pixels characterized by a unit pixel size that is greater than that which provides an amount of light energy representing a defect of a selected size but less than that which provides an amount of light energy representing a die circuit pattern feature that would render undetectable the defect of the selected size.

2. The method of claim 1 in which the selected features include central segments of straight edge features of the random die circuit patterns.

3. The method of claim 1 in which the relatively nontransparent portion includes an array of discrete frequency dots that block spatial frequency components corresponding to the repetitive pattern and zero order diffracted light bars that block spatial frequency components corresponding to the central segments of straight edge features of the random circuit pattern.

4. The method of claim 1 in which the filtered light pattern includes light spots representing corner features of the random circuit pattern and light spots representing defects.

5. The method of claim 1 in which the unit pixel size is much greater than twice a selected minimum defect size.

6. The method of claim 1 in which the nontransparent portion of the optical filter filters light representing localized repetitive patterns in the random die circuit patterns to reduce a light energy ratio of repetitive and random die circuit pattern features to defects.

7. The method of claim 1 in which the patterned specimen is a semiconductor wafer.

8. A method of inspecting a patterned specimen having areas of repetitive and random circuit patterns, the random circuit pattern having at least some straight edge features with central segments terminating in end portions, comprising;

illuminating a region of the circuit pattern areas;

generating a light pattern representing substantially the Fourier transform pattern of the illuminated region of the circuit pattern areas;

positioning an optical filter to receive the light pattern and to block spatial frequency components thereof, the optical filter having relatively transparent and relatively nontransparent portions, the relatively nontransparent portion conforming to the Fourier transform pattern of a reference pattern corresponding to the repetitive and random circuit patterns, and the relatively nontransparent portion including regions that block substantially all spatial frequency components corresponding to the repetitive circuit pattern and that block spatial frequency components corresponding to the central segments of straight edge features of the random circuit pattern;

collecting spatial frequency components not blocked by the optical filter to form a filtered light pattern that includes image defect information; and processing unblocked optical frequency components to determine the presence of a possible defect, the processing including defining an array of pixels for the filtered light pattern for each of multiple pixels in the array and determining an amount of light present in the pixel, each of the multiple pixels characterized by a pixel size that is set to achieve a predetermined sensitivity for distinguishing in the filtered light pattern a defect from end portions of the straight edge features of the random circuit pattern.

9. The method of claim 8 in which the random circuit pattern includes at least some areas having central portions bounded by edges with corner features, in which the relatively nontransparent portion further includes regions that block spatial frequency components corresponding to the central portions of areas bounded by edges, and in which the pixel is set to a size for distinguishing in the filtered light pattern a defect from the end portions of the straight edge features and from the corner features of areas bounded by edges.

10. The method of claim 9 in which the patterned specimen is a semiconductor wafer.

11. A method of implementing high speed, high detection sensitivity die to statistical image inspection of a patterned specimen that includes areas of repetitive and random circuit patterns having pattern features, comprising:

illuminating the patterned specimen with coherent light to form a light pattern representing the patterned specimen;

using coherent optical filtering to produce a filtered light pattern having spatial frequency components corresponding to the Fourier transform of the patterned specimen, the filtered light pattern conforming to the Fourier transform of residual pattern features of the random circuit patterns and a possible defect; and processing the spatial frequency components to determine the presence of a possible defect in the patterned specimen, the processing including defining an array of pixels for the filtered light pattern, calculating for each of multiple pixels in the array a statistical characteristic derived from an amount of light energy present in the pixel and amounts of light energy present in neighboring pixels, and, for each of the multiple pixels, determining whether the statistical characteristic is different from a statistical characteristic of a corresponding pixel in a previously calculated and stored reference statistical image to determine whether an amount of light energy present in the pixel is indicative of the presence of a defect or a pattern feature of a random circuit pattern.

12. The method of claim 11 in which the stored reference statistical characteristic is determined from the patterned specimen under inspection.

13. The method of claim 11 in which the stored reference statistical characteristic is determined from a standard reference specimen of the same type as that of the patterned specimen under inspection.

14. The method of claim 11 in which the coherent optical filtering entails use of a spatial filter having a nontransparent region that includes discrete frequency dots to block light representing the repetitive circuit pattern and multiple zero order diffracted light bars to block light representing portions of straight edge features of the random circuit pattern.

15. The method of claim 11 in which the coherent optical filtering entails use of a spatial filter having a nontransparent region that includes discrete frequency dots to block light representing the repetitive circuit pattern and multiple zero order diffracted light bars to block light representing central portions of areas bounded by edges of the random circuit pattern.

16. The method of claim 11 in which the patterned specimen is a semiconductor wafer.

* * * * *